US007090913B2

(12) United States Patent
Bourdelais et al.

(10) Patent No.: US 7,090,913 B2
(45) Date of Patent: Aug. 15, 2006

(54) SECURITY DEVICE WITH SPECULAR REFLECTIVE LAYER

(75) Inventors: Robert P. Bourdelais, Pittsford, NY (US); Cheryl J. Kaminsky, Webster, NY (US); Wen-Li A. Chen, Rochester, NY (US); Yawcheng Lo, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 276 days.

(21) Appl. No.: 10/439,662

(22) Filed: May 16, 2003

(65) Prior Publication Data

US 2004/0229022 A1 Nov. 18, 2004

(51) Int. Cl.
*B32B 3/00* (2006.01)
*B42D 15/00* (2006.01)

(52) U.S. Cl. ................... 428/195.1; 428/201; 428/209; 428/457; 428/411.1; 283/74; 283/94; 283/107

(58) Field of Classification Search ..................... None
See application file for complete search history.

(56) References Cited

U.S. PATENT DOCUMENTS 4,629,647 A 12/1986 Sander
4,683,371 A * 7/1987 Drexler ...................... 235/487
4,782,219 A * 11/1988 Crater ................... 235/462.21
4,948,719 A 8/1990 Koike et al.
5,302,574 A 4/1994 Lawrence et al.
5,387,571 A 2/1995 Daly
5,881,196 A 3/1999 Phillips
6,030,759 A 2/2000 Gula et al.
6,291,150 B1 9/2001 Camp et al.
6,446,865 B1 9/2002 Holt et al.
6,468,379 B1 10/2002 Naito et al.
6,535,667 B1 3/2003 Gozum et al.

FOREIGN PATENT DOCUMENTS

| | | | |
|---|---|---|---|
| EP | 0 420 261 | | 9/1990 |
| EP | 1 182 054 | | 2/2002 |
| WO | 91/06925 | * | 5/1991 |
| WO | 02/00446 | | 1/2002 |

* cited by examiner

*Primary Examiner*—Jennifer McNeil
*Assistant Examiner*—Timothy M. Speer
(74) *Attorney, Agent, or Firm*—Paul A. Leipold

(57) ABSTRACT

The invention relates to a validation device comprising at least one specular reflective layer, indicia on said reflective layer, a polymer protective layer overlaying said indicia, and a polymer protective layer on the side of the reflective layer opposite to said indicia wherein said indicia are formed by thermal dye transfer.

47 Claims, 3 Drawing Sheets

SECURITY DEVICE WITH SPECULAR REFLECTIVE LAYER

FIELD OF THE INVENTION

The invention relates to security materials. In a preferred form it relates to the use of indicia over a specular reflective layer for security purposes.

BACKGROUND OF THE INVENTION

The proliferation of transaction cards, which allowed the cardholder to pay with credit rather than cash, started in the United States in the early 1950s. Initial transaction cards were typically restricted to select restaurants and hotels and were often limited to an exclusive class of individuals. Since the introduction of plastic credit cards, the use of transaction cards have rapidly proliferated from the United States, to Europe, and then to the rest of the world. Transaction cards are not only information carriers, but also typically allow a consumer to pay for goods and services without the need to constantly possess cash, or if a consumer needs cash, transaction cards allow access to funds through an automatic teller machine (ATM). Transaction cards also reduce the exposure to the risk of cash loss through theft and reduce the need for currency exchanges when traveling to various foreign countries. Due to the advantages of transaction cards, hundreds of millions of cards are now produced and issued annually, thereby resulting in need for companies and individuals to protect against forgery and theft.

Initially, the transaction cards often included the issuer's name, the cardholder name, the card number, and the expiration date embossed onto the card. The cards also usually included a signature field on the back of the card for the cardholder to provide a signature to protect against forgery and tempering. Thus, the initial cards merely served as devices to provide data to merchants and the only security associated with the card was the comparison of the cardholder signature on the card to the cardholder signature on the receipt. However, many merchants often forget to verify the signature on the receipt with the signature on the card.

Due to the popularity of transaction cards, transaction cards now also include graphic images, designs, photographs and security features. One security feature now incorporated is a diffraction grating, or holographic image, which appears to be three dimensional and which substantially restricts the ability to fraudulently copy or reproduce transaction cards because of the need for extremely complex systems and apparatus for producing holograms. A hologram is produced by interfering two or more beams of light, namely an object beam and reference beam, onto a photoemulsion to thereby record the interference pattern produced by the interfering beams of light. The object beam is a coherent beam reflected from, or transmitted through, the object to be recorded, such as a company logo, globe, character or animal. The reference beam is usually a coherent, collimated light beam with a spherical wave front. After recording the interference pattern, a similar wavelength reference beam is used to produce a holographic image by reconstructing the image from the interference pattern. However, forgers have developed counterfeiting methods. One response to the increased prevalence of counterfeiting has been to produce holograms of increasing complexity, but this has also led to increased cost. Other approaches have relied upon the use of covert images and special authentication or verification equipment, e.g., a laser, to enable the detection of such images, but such equipment has often been expensive and difficult to use. Thus, there is a continuing need in the art for secure articles that are extremely difficult to counterfeit, that can be cost-effectively produced, and that can be easily and inexpensively authenticated or verified under field conditions.

The transaction card industry started to develop more sophisticated transaction cards that allowed the electronic reading, transmission, and authorization of transaction card data for a variety of industries. For example, magnetic stripe cards, smart cards, and calling cards have been developed to meet the market demand for expanded features, functionality, and security. In addition to the visual data, the incorporation of a magnetic stripe on the back of a transaction card allows digitized data to be stored in machine readable form. As such, magnetic stripe reader are used in conjunction with magnetic stripe cards to communicate purchase data received from a cash register device on-line to a host computer along with the transmission of data stored in the magnetic stripe, such as account information and expiration date. The magnetic strips are susceptible to tampering, have a lack of confidentiality of the information within the magnetic stripe, and have problems associated with the transmission of data to a host computer.

U.S. Pat. No. 6,468,379 (Naito et al.) discloses a thermal donor and receiver where a security layer could be transferred as a donor layer to the thermal substrate. This forgery preventative layer could contain special decorative effect, hologram layer, a diffraction grating, or florescent materials. This layer would most likely be placed over the thermal image making it susceptible to scratches, wear, and tampering. Furthermore, the diffraction grating and hologram are easily be copied by new reproduction methods available.

U.S. Pat. No. 5,881,196 (Phillips) discloses The use of Wavelength filtering in the cladding layers using interference coatings and colorants produces waveguide modes of different colors. While it is a quick and simple way of testing for authenticity, the color shift may be produced by different means making it vulnerable to counterfeiting. It is desirable to have the light exiting the waveguide in more than one area of the device to make counterfeiting more difficult.

U.S. Pat. No. 6,446,865 (Holt et al.) discloses a badge that is illuminated with a visible wavelength of light and is reflected by a retroreflective film. An imaging system detecting the reflected light from the retroreflective film on the badge and detecting the reflected light from the physical characteristic of the person wearing the badge. The two imaging systems are a Sequential Laser Raster Scanning System and a Simultaneous CCTV Image Frame Freeze System. While this invention provides a high level of security, a machine is required to read the information and determine the authenticity of the ID card. The imaging system would be cost prohibitive and would be very difficult to be made into a portable authenticating system. It would be desirable to have an easily viewable way of detecting the authenticity of a security document and to have a device that had both optical and electrical means of authentication.

U.S. Pat. No. 6,291,150 (Camp at al.) and U.S. Pat. No. 4,948,719 (Koike et al.) disclose the use of a metallic layer in silver halide imaging elements. Silver halide is very sensitive to metals in sensitizing the emulsion and in processing the images. The metal can cause fogging or can leach out and contaminate the processing chemistry forming defects on the finished image. Silver would be the most suitable metal because it is also in the silver halide imaging emulsion, but even silver could create contamination and printing issues. Other metals are generally excluded because of the possible reaction and sensitization of the silver halide.

It would be preferable to use a printing technology what is not restricted in the use of reflective layers. There is also a possibility of delamination of the metal and the photosensitive layer during, before or after development because of poor adhesion to the metal layer. Furthermore, Camp and Kiole used substantially uniform blanket coatings of metal. It would be more useful to have a patterned metal coating for a security application because it more difficult to counterfeit, copy, or scan. The inventions only utilize the optical properties of the metallic layer. Metallic layers have other unanticipated features and there remains a need in the industry for a feature to have both electrical and optical security elements.

PROBLEM TO BE SOLVED BY THE INVENTION

There is a need for specularly reflective layers with indicia that can provide security features for security media.

SUMMARY OF THE INVENTION

It is an object of the invention to provide security features for a security media.

It is another object to provide a security feature that is difficult to counterfeit, copy, or scan.

It is a further object to provide a security feature that has both electrical and optical security elements.

These and other objects of the invention are accomplished by a validation device comprising at least one specular reflective layer, an indicia layer on said reflective layer, a polymer protective layer overlaying said indicia layer, and a polymer protective layer on the side of the reflective layer opposite to said indicia layer wherein said indicia layer are formed by thermal dye transfer.

ADVANTAGEOUS EFFECT OF THE INVENTION

The invention provides improved security for a validation device. The invention includes indicia layer and a specularly reflective layer to form a security feature that is difficult to scan or copy and has both optical and electrical security elements.

DETAILED DESCRIPTION OF THE INVENTION

Figure 1:
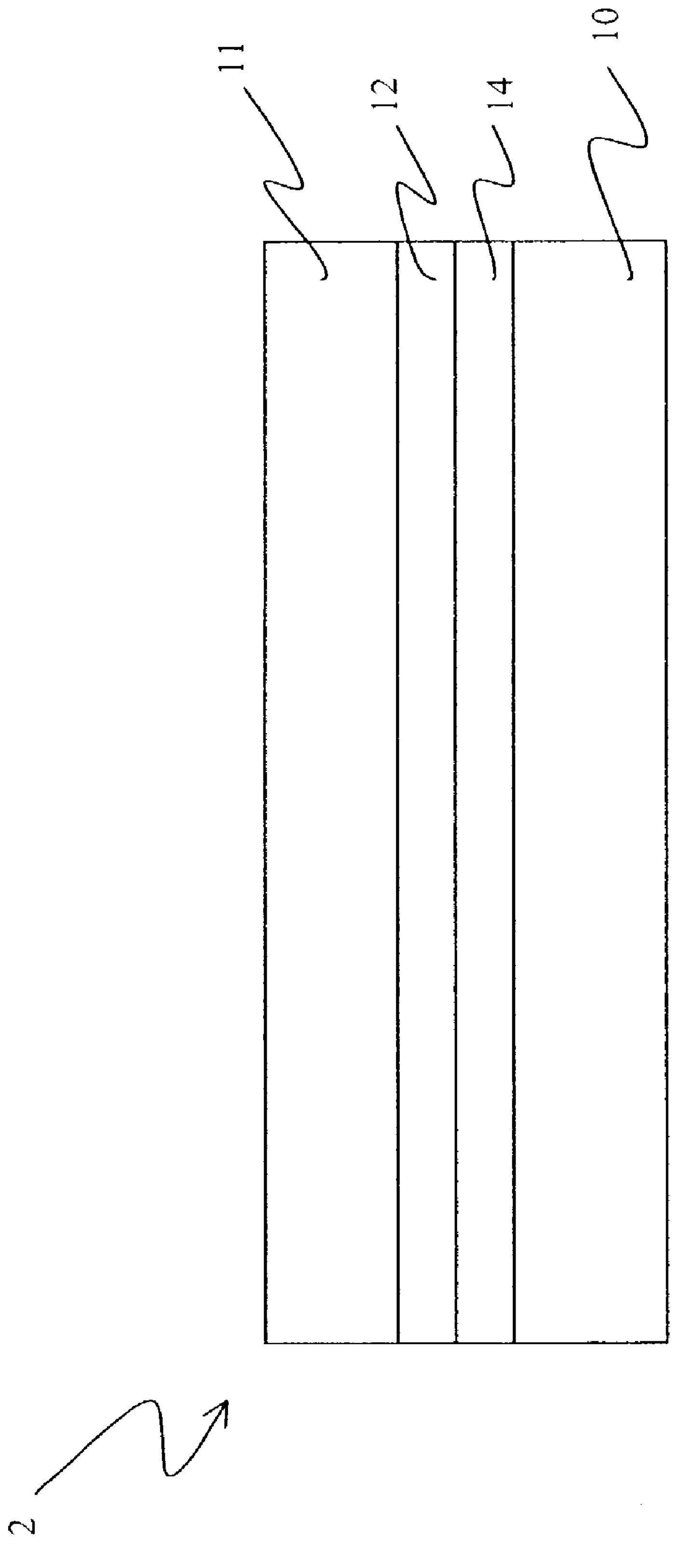
FIG. 1 illustrates a cross section of a validation device that comprises in order, a protective layer, indicia layer, a specular reflective layer, and a protective layer.

The image device of this example has numerous advantages over prior art image devices for security purposes.

The validation device prevents tampering better than some prior art image devices for security. Prior art devices, such as credit cards, use holograms that are adhered to the front of the devices. These holograms can be taken off and reapplied to other devices to make fake credit cards and IDs. Because the specular reflectivity layer of the invention is very delicate and adhered to the indicia layer, the specular reflectivity layer is destroyed if it is tampered with or the card is opened.

The validation device is designed such that it are nearly impossible to copy, even when using an advanced color photocopying techniques or scan because of the specular reflectivity of the validation device.

The validation device of this invention can be easily authenticated using both optical and electrical measurements. The optical measurements can be of the specular reflectivity or of the pattern of the specular reflectivity. The electrical measurements measure the conductivity of the reflective layer though openings in the protective layer. The validation device has both an easily viewed security feature in the optical measurement for a quick assessment of authenticity and an electrical feature that requires equipment to authenticate the device as a secondary more difficult to forge feature.

The validation device can also have a pattern of metallic specular reflectivity that can form seals and other indicia that appear to be holographic like. These patterns can be formed by many methods including thermal printing metals resulting in a hologram-like metallic pattern that can be customizable at time of manufacture of each validation device.

The validation device also contains a light guiding layer that adds an another layer of security to the validation device. The light guide is an easy way for authentication because all that is needed is a light source and a viewer. The light guiding layer can change the color of the light, or can light up parts of the indicia printed on the validation device.

The invention further provides polymer layers that serve as wear resistant surfaces on both sides of the image device so it will not be easily damaged during handling or use of the image, as the image and specular reflective layer are below a protective layer. The wear resistant surfaces of the invention provide protection from fingerprinting, spills of liquids, and other environmental deleterious exposures.

The validation device has multiple validation and anti-counterfeiting features and a validation device may include one, some, or all of these features based on the amount of security desired and the amount per device that is willing to be spent. The validation device is being tailored to the security needs of the particular application and method of detection. For example, a state police officer might want a light guiding security feature that is easily detectable with a flashlight, but may not require a security feature where an electrical tester be used in the field. These and other advantages will be apparent from the detailed description below.

The term "pattern" means any predetermined arrangement whether regular or random. The term "light" means visible light. The term "total light transmission" means percentage light transmitted through the sample at 500 nanometers as compared to the total amount of light at 500 nanometers of the light source. This includes both spectral and diffuse transmission of light. "Transparent" means a film with total light transmission of 80% or greater at 500 nanometers. "Substantially transparent" means that the object or film transmits at least 70% of the light incident on it.

The "specular area" of the image device is defined as where most of the light reflecting off the surface of the device is reflected specularly (not diffused). The diffuse reflection of light reflected off this area is typically less than 30%. The "diffuse area" of the image device is defined as where most of the light reflecting off the surface of the device is reflected diffusely. The diffuse reflection of light reflected off this area is typically more than 70%. The term "polymeric film" means a film comprising polymers. The term "polymer" means homo- and co-polymers.

The specular reflective layer preferably comprises a metallic layer. Metals, such as gold or silver, have very efficient reflectivity that when used in the reflector, increases the efficiency of the reflector. Metal also adds strength, hardness, and electrical conductivity properties to the reflection film. In another embodiment, the reflective layer comprises an alloy. Using an alloy is preferred because the reflectance and mechanical properties can be tailored by using two or more metals with different properties. Using different metal or alloys can produce different colored specular reflective layers. Metals can be applied using vacuum deposition or cathode sputtering and have a high amount of high specular reflection with a very thin layer of metal, saving material costs. Thin metallic layers, produce images that are difficult or impossible to photocopy and are thus particularly suited for generating optical security devices.

The metallic reflective layer preferably has a thickness of less than about 10 microns, so that it is extremely difficult to remove the foil from a security article to which it has been applied, without at least partially tearing or destroying the foil. An image device where the base with areas of diffuse and specular reflectivity has a scratch sensitivity of less than 0.1 GPa is preferred. When the image device is assembled, the overlaying indicia layer and protective layer protect the metallic reflective layer. Because the metallic reflectivity area is very scratch prone, it reduces the ability for forgery. If the validation device to is be taken apart to insert another image, the metallic reflectivity layer will tear and destroy itself. Having a low scratch sensitivity helps insure that the image device is difficult to be tampered with.

Preferably, the metallic layer is in a discontinuous pattern. The discontinuous pattern provides a security feature that can be either visible or invisible to the observer. The visible discontinuities can form patterns, dots, lines, images, text, and diffraction patterns.

The metal is preferably thermal transferred to create the specular reflective layer. The thermal transfer of metal can create uniform field of metal or can easily create patterns of metal. Materials can be transferred from the transfer layer of a thermal mass transfer donor element to a receptor substrate by placing the transfer layer of the donor element adjacent to the receptor and applying heat or radiation. Material from the thermal transfer layer can be selectively transferred to a receptor in this manner to image-wise form patterns of the transferred material on the receptor. In many instances, thermal transfer using light from, for example, a lamp or laser, is advantageous because of the accuracy and precision that can often be achieved. The size and shape of the transferred pattern (e.g., a line, circle, square, or other shape) can be controlled by, for example, selecting the size of the light beam, the exposure pattern of the light beam, the duration of directed beam contact with the thermal mass transfer element, and/or the materials of the thermal mass transfer element. Alternatively, a thermal print head or other heating element (patterned or otherwise) can be used to selectively heat the donor element directly, thereby pattern-wise transferring portions of the transfer layer. Thermal print heads or other heating elements may be particularly suited for creating patterned metallic specular reflectivity layers.

Using masking, the desired pattern is formed in the mask and the metal is applied through the mask. If the desired pattern of specular reflectivity is known and many copies are to be produced (such as a seal for a driver's license) masking is a way to quickly and inexpensively create the metallic pattern. Masking can be used in any application where metal is being applied such as screen printing or vacuum deposition. Irradiating a thermal donor element with a metallic element through a mask can also control the reflective pattern.

The discontinuous patterns preferably have discontinuous portions of less than 2 micrometers. Discontinuous portions of less than 2 micrometers are below the threshold for the human eye so to an observer, the metallic layer would appear to be continuous. A machine could detect the discontinuous portions either electronically or optically. This could create another level of security for the validation device that would be difficult to counterfeit.

In another embodiment, the discontinuous patterns preferably have discontinuous portions of between 5 and 100 micrometers. When the discontinuous portions are between 5 and 100 micrometers, the discontinuous portions can been seen by the eye and can form a pattern, image, or graphic. This is an easily authenticated security feature that can quickly assessed. More preferably, the metallic layer has discontinuities both below 2 micrometers and between 5 to 100 micrometers so that the validation device has both visual authentication and machine authentication. For example, a police officer can easily evaluate the authenticity of the validation device by eye and as a secondary check, can use a machine to verify the authenticity.

The validation device has at least one specular reflective layer that preferably comprises differently colored portions in the plane of the layer. This adds another level of security to the validation device that is easily seen by observers' eyes. The different colors could come from the use of different metals in the specular reflection layer or could be printed on using dyes and/or pigments. A multi-colored specular reflection layer would be more difficult to counterfeit because it would be difficult to recreate all of the colors with the correct colorimetry and density.

The different color portions of the specular reflective layer are preferably metameric matches where under some illumination sources the two or more colors look the same to the viewer's eye, but under different illumination, they look like different colors. To verify that a device is authentic, the device would be placed under two different light sources where the colors would appear to be the same color in one illumination, but different colors in a second illumination. The test would be inexpensive and a person could view the results so that no expensive validation machinery would be necessary. Furthermore, the colors can form an image or pattern to increase the complexity of the security feature adding another layer of security.

In one embodiment, at least one specular reflective layer comprises multiple polymer layers of differing refractive indexes. The multilayer optical bodies reflect light over a wavelength range (e.g., all or a portion of the visible, IR, or UV spectrum). The multilayer optical bodies are typically coextruded and oriented multilayer structures. The multilayered polymer film has layers with an average thickness of not more than 0.5 micrometers, preferably. More particularly, the multilayered polymer film comprises layers of a birefringent polymer, especially a crystalline, semi-crystalline, or liquid crystalline material, such as naphthalene dicarboxylic acid polyester, for example a 2,6-polyethylene naphthalate ("PEN") or a copolymer derived from ethylene glycol, naphthalene dicarboxylic acid and some other acids ("coPEN"), having an average thickness of not more than 0.5 microns, and preferably with a positive stress optical coefficient, i.e., upon stretching, its index of refraction in the stretch direction increases; and layers of a selected second polymer, for example a polyethylene terephthalate ("PET") or a coPEN, having an average thickness of not more than 0.5 microns. Preferably, after stretching these multilayered polymer films in at least one direction, the layers of said naphthalene dicarboxylic acid polyester have a higher index of refraction associated with at least one in-plane axis than the layers of the second polymer. The multilayered polymer specular reflective layer is advantaged because the layer gives high amounts of specular reflectivity without incorporating metal into the device. The metal in the device could interfere with other authentication methods of the validation device. Furthermore, it is preferred that the multilayer reflector and a thermal dye sublimation layer are co-extruded. This creates a specular reflective layer with a thermal dye receiving layer reducing the number of processing steps and time to create the validation device. Because the specular reflective layer and thermal dye receiving layer are formed integral to each other, there is excellent adhesion between the two layers, creating a more durable validation device.

A metal-coated multilayer polymer mirror having high reflectivity and high specularity is preferred. The resulting metal-coated multilayer mirror has higher reflectivity than either the multilayered polymer film or the reflective metal alone.

For the indicia layer to be formed by thermal dye transfer with high density and color saturation, a thermal dye receiving layer is typically used. This dye receiving layer can be applied (for example extruded or coated) or co-extruded with the specular reflective layer.

Illustrated in FIG. 1 is an illustration of a validation device 2 with a specular reflective layer and indicia. The layers of the validation device of FIG. 1, in order, are an upper protective layer 11, an indicia layer 12, a specular reflective layer 14, and a lower protective layer 10. The configuration of the elements in FIG. 1 are preferred because they form a simple to manufacture and authenticate validation device.

Figure 2:
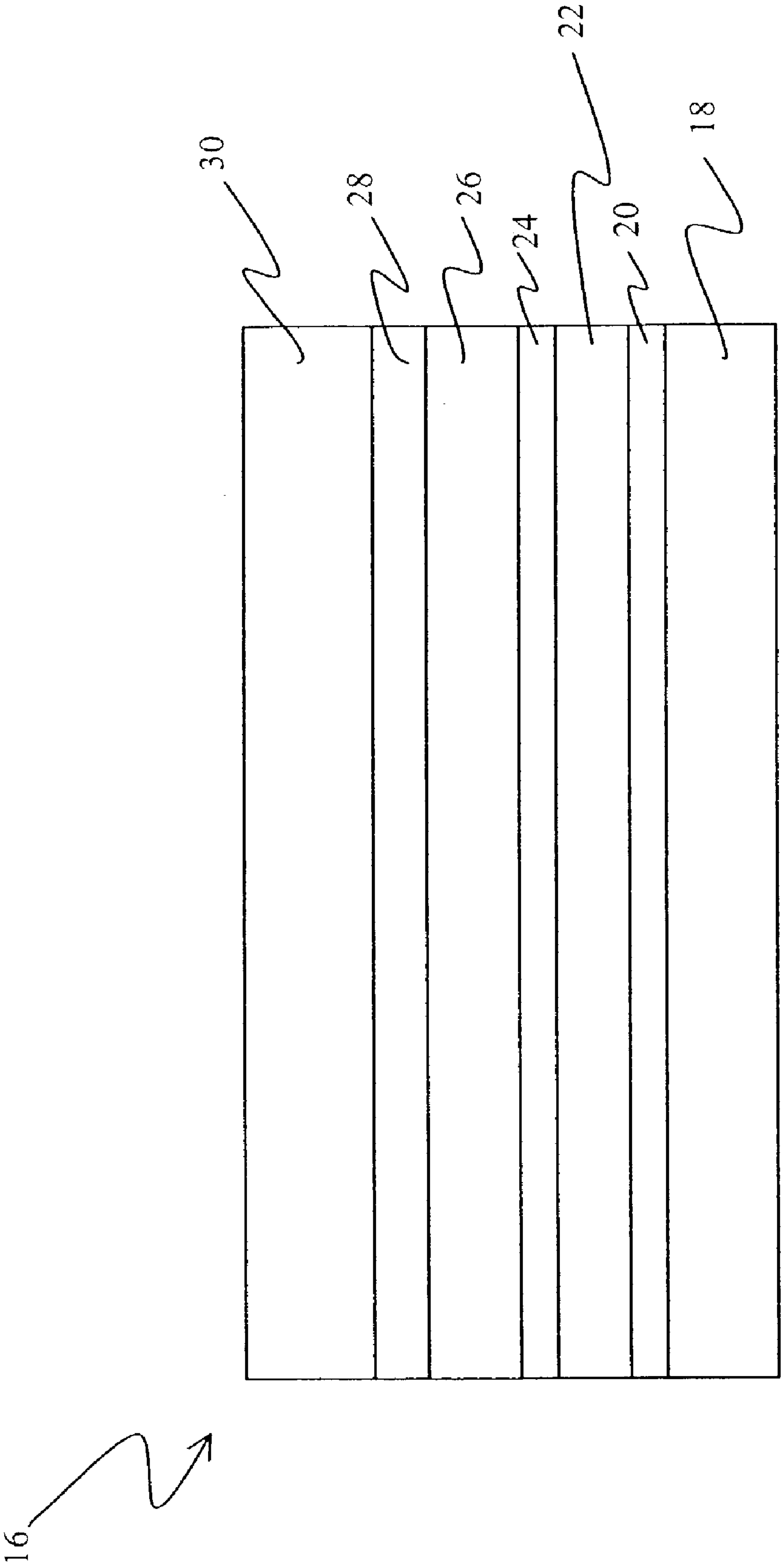
FIG. 2 illustrates a cross section of a validation device that comprises in order, a protective layer, indicia, a specular reflective layer with openings, a cladding layer, a light guiding layer, a cladding layer, and a protective layer.

Illustrated in FIG. 2 is an illustration of a validation device 16 with a metallic specular reflective layer with an indicia layer 28, and a light guiding layer 22. The layers of the validation device, in order, are an upper protection layer 30, an indicia layer 28, a specular reflective layer 26, the upper cladding layer 24, the light guiding layer 22, the lower cladding layer 20, and a lower protective layer 18. Indicia layer 28 generally is an ink, thermal transfer, or dye printed layer. The configuration of the elements in FIG. 2 are preferred because the validation device created has multiple anti-forgery features and is easily manufacturable.

Figure 3:
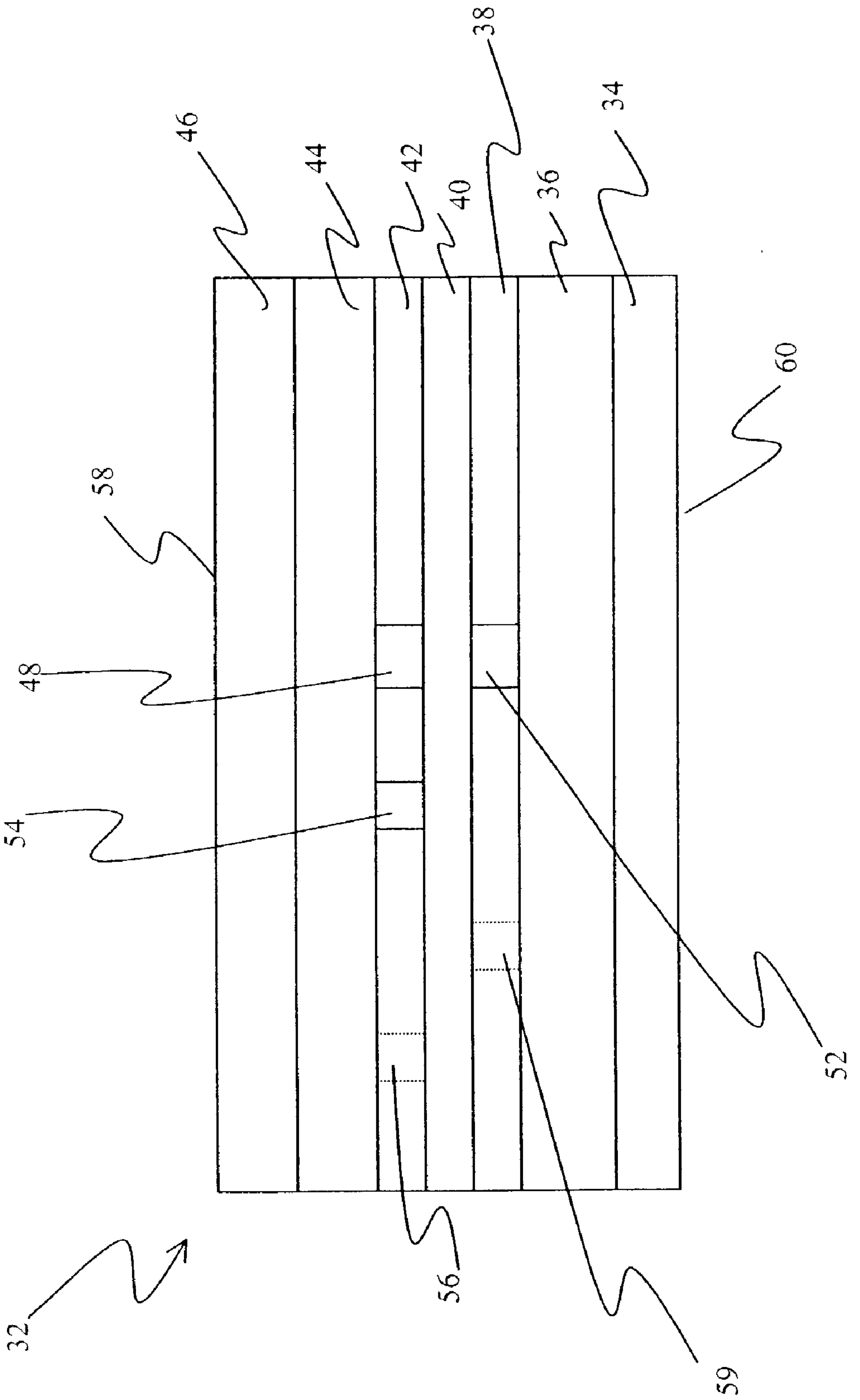
FIG. 3 illustrates a cross section of a validation device that comprises in order, a protective layer, indicia, a specular reflective layer with openings, a light guiding layer, a specular reflective layer with openings, indicia, and a protective layer.

Illustrated in FIG. 3 is an illustration of a validation device 32 with two specular reflective layers 42 and 38 surrounding a light guiding layer 40 and indicia layers 44 and 36. Indicia layer 44 and 36 generally is a printed layer formed by a method such as ink, thermal transfer or dye printing. The layers of the validation device, in order, are an upper protection layer 46, an upper indicia layer 44, the upper reflective layer 42, the light guiding layer 40, the lower reflective layer 38, the lower indicia layer 36, and a lower protective layer 34. The configuration of the elements in FIG. 3 are preferred because the validation device created has many anti-forgery and anti-counterfeiting features.

The holes 48 and 52 in the reflective layers 42 and 38 are in register such that light applied from surface 58 is visible on surface 60. Holes 54, 56 and 59 in reflective layers 42 and 38 allow light to escape from the light guide 40 to be visible on surfaces 58 and 60.

Polycarbonates (the term "polycarbonate" as used herein means a carbonic acid and a diol or diphenol) and polyesters have been suggested for use in image-receiving layers. Polycarbonates (such as those disclosed in U.S. Pat. Nos. 4,740,497 and 4,927,803) have been found to possess good dye uptake properties and desirable low fade properties when used for thermal dye transfer. As set forth in U.S. Pat. No. 4,695,286, bisphenol-A polycarbonates of number average molecular weights of at least about 25,000 have been found to be especially desirable in that they also minimize surface deformation that may occur during thermal printing.

Polyesters can be readily synthesized and processed by melt condensation using no solvents and relatively innocuous chemical starting materials. Polyesters formed from aromatic diesters (such as disclosed in U.S. Pat. No. 4,897,377) generally have good dye up-take properties when used for thermal dye transfer. Polyesters formed from alicyclic diesters disclosed in U.S. Pat. No. 5,387,571 (Daly) and polyester and polycarbonate blends disclosed in U.S. Pat. No. 5,302,574 (Lawrence et al.), the disclosure of which is incorporated by reference.

Polymers may be blended for use in the dye-receiving layer in order to obtain the advantages of the individual polymers and optimize the combined effects. For example, relatively inexpensive unmodified bisphenol-A polycarbonates of the type described in U.S. Pat. No. 4,695,286 may be blended with the modified polycarbonates of the type described in U.S. Pat. No. 4,927,803 in order to obtain a receiving layer of intermediate cost having both improved resistance to surface deformation which may occur during thermal printing and to light fading which may occur after printing. A problem with such polymer blends, however, results if the polymers are not completely miscible with each other, as such blends may exhibit a certain amount of haze. While haze is generally undesirable, it is especially detrimental for transparency receivers. Blends that are not completely compatible may also result in variable dye uptake, poorer image stability, and variable sticking to dye donors.

The polyester polymers used in the dye-receiving elements of the invention are condensation type polyesters based upon recurring units derived from alicyclic dibasic acids (Q) and diols (L) wherein (Q) represents one or more alicyclic ring containing dicarboxylic acid units with each carboxyl group within two carbon atoms of (preferably immediately adjacent to) the alicyclic ring and (L) represents one or more diol units each containing at least one aromatic ring not immediately adjacent to (preferably from 1 to about 4 carbon atoms away from) each hydroxyl group or an alicyclic ring which may be adjacent to the hydroxyl groups. For the purposes of this invention, the terms "dibasic acid derived units" and "dicarboxylic acid derived units" are intended to define units derived not only from carboxylic acids themselves, but also from equivalents thereof such as acid chlorides, acid anhydrides and esters, as in each case the same recurring units are obtained in the resulting polymer. Each alicyclic ring of the corresponding dibasic acids may also be optionally substituted, e.g. with one or more $C_1$ to $C_4$ alkyl groups. Each of the diols may also optionally be substituted on the aromatic or alicyclic ring, e.g. by $C_1$ to $C_6$ alkyl, alkoxy, or halogen.

In a preferred embodiment of the invention, the alicyclic rings of the dicarboxylic acid derived units and diol derived units contain from 4 to 10 ring carbon atoms. In a particularly preferred embodiment, the alicyclic rings contain 6 ring carbon atoms.

A dye-receiving element for thermal dye transfer comprising a miscible blend of an unmodified bisphenol-A polycarbonate having a number molecular weight of at least about 25,000 and a polyester comprising recurring dibasic acid derived units and diol derived units, at least 50 mole % of the dibasic acid derived units comprising dicarboxylic acid derived units containing an alicyclic ring within two carbon atoms of each carboxyl group of the corresponding dicarboxylic acid, and at least 30 mole % of the diol derived units containing an aromatic ring not immediately adjacent to each hydroxyl group of the corresponding diol or an alicyclic ring are preferred. This polymer blend has excellent dye uptake and image dye stability, and which is essentially free from haze. It provides a receiver having improved fingerprint resistance and retransfer resistance, and can be effectively printed in a thermal printer with significantly reduced thermal head pressures and printing line times. Surprisingly, these alicyclic polyesters were found to be compatible with high molecular weight polycarbonates.

Examples of unmodified bisphenol-A polycarbonates having a number molecular weight of at least about 25,000 include those disclosed in U.S. Pat. No. 4,695,286. Specific examples include Makrolon 5700 (Bayer AG) and LEXAN 141 (General Electric Co.) polycarbonates.

In a further preferred embodiment of the invention, the unmodified bisphenol-A polycarbonate and the polyester polymers are blended at a weight ratio to produce the desired Tg of the final blend and to minimize cost. Conveniently, the polycarbonate and polyester polymers may be blended at a weight ratio of from about 75:25 to 25:75, more preferably from about 60:40 to about 40:60.

Among the features of the polyesters for the preferred blends of the invention is that they do not contain an aromatic diester such as terephthalate, and that they be compatible with the polycarbonate at the composition mixtures of interest. The polyester preferably has a Tg of from about 40° C. to about 100° C., and the polycarbonate a Tg of from about 100° C. to about 200° C. The polyester preferably has a lower Tg than the polycarbonate, and acts as a polymeric plasticizer for the polycarbonate. The Tg of the final polyester/polycarbonate blend is preferably between 40° C. and 100° C. Higher Tg polyester and polycarbonate polymers may be useful with added plasticizer. Preferably, lubricants and/or surfactants are added to the dye receiving layer for easier processing and printing. The lubricants can help in polymer extrusion, casting roll release, and printability.

Preferably, the dye receiving layer is co-extruded. Some dye receiving layers have poor adhesion to typical substrates such as polyester or metal. Co-extruding the dye receiving layer (DRL) allows for a tie layer(s) that has good adhesion to the DRL and substrate to allow for easy processability.

Preferably, the validation device has at least one specular reflective layer that has a light transmission of less than 1%. Having one specular reflective layer with a light transmission of less than 1% enables an easily readable device because most of the light incident off the device will be reflected. Having a very reflective specular reflective layer also separates the front and back indicia printed. If the light transmission for all the layers of specular reflectivity were approximately 20% or more, the back indicia could be seen through the front of the device obscuring the front indicia and making the validation device difficult to read. Preferably, the thickness of at least one of the specular reflective layers in the validation device is between 500 and 2000 angstroms. It has been shown that this range of thickness of the specular reflective layer results in specular reflective layers with light transmissions of less than 1%. When the reflective layer is more than 2300 angstroms thick, the light transmission does not decrease significantly, but materials costs increase.

In another embodiment of the invention, at least one of the specular reflective layers has a light transmission of between 10 and 90%. This is preferred so that the front and back indicia could be viewed in combination. For example, The front of the validation device could have an image, text, and part of a seal. The back of the validation device could hold the other part of the seal. When the card is viewed (most easily seen when the card is backlit) the two parts of the seal match to form a complete seal. When front lit, more of the light will reflect off of the specular reflective layer and the back of the device with the second part of the seal will not be easily viewed. Adding indicia to the surfaces of the card in registration adds another level of security to the validation device. With a high light transmission, the card does not have much reflection off of the specular reflective layer so the device appears not to have a specular reflective layer, but still holds its anti-counterfeiting properties of being difficult to photocopy or scan. Preferably, at least one of the specular reflective layers has a thickness of 10 to 100 angstroms. It has been shown that this range in thicknesses produces specular reflective layers with transmissions of between 10 and 90%.

A pencil hardness of at least 3 H is preferred for the protective layer above the indicia. This insures that the protective layer, which is typically the outside surface of the validation device, holds up to normal wear and tear. A pencil hardness of 3 H will be durable and resist scratches. Pencil hardness can be measured by JIS-K5400 with the aid of a pencil hardness tester under a load of 1 kg, the highest hardness producing no scratch on the film being recorded as test value.

The protective layer is optimized in many instances to protect security image from tampering and wear while permitting it to be readily inspected and read. The protective layer is typically optimized to maintain its clarity, transparency, color, and appearance under the conditions to which card is subjected, e.g., abrasion and wear.

Preferably the protective layer comprises a polymer. Polymers are easily processed, generally inexpensive, and can be manufactured roll to roll, tear resistant, and have excellent conformability, good chemical resistance and high strength. Polymers are preferred, are those that are strong and flexible. Preferred polymers include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferably, polyvinyl resins include polyvinyl chloride, poly(vinyl acetal), and mixtures thereof.

Copolymers of vinyl resins can also be utilized. Preferred polyesters for the complex lens of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof.

The polymer protective film preferably has a surface microstructure that can comprise any surface structure, whether ordered or random on either the exposed side of the film or the side of the film attached to the other layers in the device. The microstructure can be a linear array of prisms with pointed, blunted, or rounded tops or sections of a sphere, prisms, pyramids, and cubes. The optical elements can be random or ordered, and independent or overlapping. The sides can be sloped, curved, or straight or any combination of the three. The surface microstructure can also be retroreflective structures, typically used for road and construction signs or a Fresnel lens designed to collimate light. The microstructure is preferably on the side of the protective film facing away from the device and towards the viewer. The microstructure can have retroreflective properties so that when a flashlight or other illumination device is used to illuminate the card the card retroreflects the light for an added security feature. The microstructure could also be an anti-glare surface structure or any other microstructure with an added utility. The microstructure can also be in the protective film facing the rest of the device. This microstructure can affect the way light passes through and reflects in the security device for an added security feature.

The protective layer with an elastic modulus greater than 500 MPa is preferred because the it is better able to with stand the rigors of handling. A protective layer with an impact resistance greater than 0.6 GPa is preferred. An impact resistance greater than 0.6 GPa allows the validation device to resist scratching and mechanical deformation.

Biaxially oriented polymer sheets are preferred as they are thin and are higher in elastic modulus compared to cast coated polymer sheets. Biaxially oriented sheets are conveniently manufactured by co-extrusion of the sheet, which may contain several layers, followed by biaxial orientation. Such biaxially oriented sheets are disclosed in, for example, U.S. Pat. No. 4,764,425.

The protective layer preferably has a hard coat on the surface of the layer to make the layer more durable difficult to scratch. A hard coating on the protection layer will typically have a thickness of about 1 to about 15 micrometers, preferably from about 2 to about 3 micrometers, and such a hard coating may be provided by free radical polymerization (initiated either thermally or by ultra-violet radiation) of an appropriate polymerizable material. A preferred hard coat for use in the present invention is the acrylic polymer coating sold under the trademark "TERRAPIN" by Tekra Corporation, 6700 West Lincoln Avenue, New Berlin, Wis. 53151. The protective layer can also contain other security features such as holograms, printing, or electronics.

The validation device preferably has at least 2 openings for direct contact of the reflective layer separated by at least 1 millimeter. These openings are used to measure the conductivity of the reflective layer. Having more than two openings allows for multiple readings where the conductivity of the reflective layer could vary across the card. This makes the validation device difficult to forge. The device may have a customizable circuit created by the discontinuities in the specular reflective layer. Creating a customizable circuit (in both appearance and resistively) makes the image device more difficult to counterfeit or tamper with.

Preferably, the areas of specular reflectivity have a resistively of between 50 and 2500 ohms per square. This range allows for the easy measurement of the conductivity of the specular reflection areas. When the resistively of the specular reflectivity areas is greater than 2650 ohms per square, the resistively of the specular reflectivity areas approaches the resistively of the rest of the card. This leads to a low signal to noise ratio and is difficult to read. A very high voltage would be needed to have a better signal to noise ratio and that would be expensive and dangerous. A resistively of less than 40 ohms per square is expensive to manufacture. 50 to 2500 ohms per square resistively allows for a high signal to noise ratio for accurate and easy measurement.

The validation device preferably comprises at least one metallic reflective layer and one conductive layer separated by a dielectric. The dielectric could be any poor conducting material such as a polymer, air, and foamed or voided polymer. The conductive layer can be transparent, translucent, or opaque and can be white, black, or colored. The validation device preferably has 2 or more openings for direct contact, at least one on each side of the validation device. An electronic measuring device can be used to measure the capacitance of the device. Measuring capacitance of the device deters forgery because the device has a very complicated structure. Furthermore, tampering with the card becomes difficult because when the device is taken apart, the conductive layers tear and the dielectric and conductive layers separate making them difficult to put back together to produce the same amount of capacitance. Capacitance measurements can be combined with other security features such as conductivity measurements to further deter counterfeiting.

Having a transparent conductive layer is preferred because the layers behind it (such as reflective layers or indicia) can still be seen. In order to provide electrically conductive conduits that have a high visible light transmission conductive polymers selected from the group consisting of substituted or unsubstituted aniline containing polymers, substituted or unsubstituted pyrrole containing polymers, substituted or unsubstituted thiophene containing polymers. The above polymers provide the desired conductivity, adhesion to other layers in the validation device and have high light transmission. The electrically conductive material of the present invention is coated from a coating composition comprising a polythiophene/polyanion composition containing an electrically conductive polythiophene with conjugated polymer backbone component and a polymeric polyanion component. A preferred polythiophene component for use in accordance with the present invention contains thiophene nuclei substituted with at least one alkoxy group, e.g., a $C_1$-$C_{12}$ alkoxy group or a —$O(CH_2H_2O)_nCH_3$ group, with n being 1 to 4, or where the thiophene nucleus is ring closed over two oxygen atoms with an alkylene group including such group in substituted form. The preparation of electrically conductive polythiophene/polyanion compositions and of aqueous dispersions of polythiophenes synthesized in the presence of polyanions, as well as the production of antistatic coatings from such dispersions is described in EP 0 440 957 (and corresponding U.S. Pat. No. 5,300,575), as well as, for example, in U.S. Pat. Nos. 5,312,681; 5,354,613; 5,370,981; 5,372,924; 5,391,472; 5,403,467; 5,443,944; and 5,575,898.

While general compositions are described above, the polythiophene/polyanion compositions employed in the present invention are not new themselves, and are commercially available. Preferred electrically-conductive polythiophene/polyanion polymer compositions for use in the present invention include 3,4-dialkoxy substituted polythiophene/poly(styrene sulfonate), with the most preferred electrically-conductive polythiophene/polyanion polymer composition being poly(3,4-ethylene dioxythiophene)/poly (styrene sulfonate), which is available commercially from Bayer Corporation as Baytron P.

Any polymeric film-forming binder, including water soluble polymers, synthetic latex polymers such as acrylics, styrenes, acrylonitriles, vinyl halides, butadienes, and others, or water dispersible condensation polymers such as polyurethanes, polyesters, polyester ionomers, polyamides, and epoxides, may be optionally employed in the conductive layer to improve integrity of the conductive layer and to improve adhesion of the antistatic layer to an underlying and/or overlying layer. Preferred binders include polyester ionomers, vinylidene chloride containing interpolymers and sulfonated polyurethanes as disclosed in U.S. Pat. No. 6,124,083. The electrically-conductive polythiophene/polyanion composition to added binder weight ratio can vary from 100:0 to 0.1:99.9, preferably from 1:1 to 1:20, and more preferably from 1:2 to 1:20. The dry coverage of the electrically-conductive substituted or unsubstituted thiophene-containing polymer employed depends on the inherent conductivity of the electrically-conductive polymer and the electrically-conductive polymer to binder weight ratio. A preferred range of dry coverage for the electrically-conductive substituted or unsubstituted thiophene-containing polymer component of the polythiophene/polyanion compositions is from about 0.5 mg/m.sup.2 to about 3.5 mg/m.sup.2, this dry coverage should provide the desired electrical resistivity values before and after photographic processing while minimizing the impact of the electrically-conductive polymer on the color and optical density of the processed photographic element.

In addition to the electrically-conductive agent(s) and polymeric binder, the electrically-conductive materials of the invention may include crosslinking agents, coating aids and surfactants, dispersing aids, coalescing aids, biocides, matte particles, waxes and other lubricants. A common level of coating aid in the conductive coating formula, e.g., is 0.01 to 0.3 weight % active coating aid based on the total solution weight. These coating aids are typically either anionic or nonionic and can be chosen from many that are applied for aqueous coating. The various ingredients of the coating solution may benefit from pH adjustment prior to mixing, to insure compatibility. Commonly used agents for pH adjustment are ammonium hydroxide, sodium hydroxide, potassium hydroxide, tetraethyl amine, sulfuric acid, and acetic acid.

The electrically-conductive materials of the invention may be applied from either aqueous or organic solvent coating formulations using any of the known coating techniques such as roller coating, gravure coating, air knife coating, rod coating, extrusion coating, blade coating, curtain coating, slide coating, and the like. After coating, the layers are generally dried by simple evaporation, which can be accelerated by known techniques such as convection heating. Known coating and drying methods are described in further detail in Research Disclosure No. 308119, Published December 1989, pages 1007 to 1008. A preferred method for the coating of the electrically conductive materials to form a pattern is to coat the conductive material into the conduits by roll coating the sheet containing the conduits followed by removal of the conductive material located at the peaks of the conduits by a scraping blade or reverse roll contacting the peaks of the conduits.

Preferably, there is a secondary indicia layer on the side of specular reflective layer opposite the indicia layer. The secondary image may be for decorative purposes, may present useful information, and/or may provide means for verifying authenticity of the card. These secondary indicia can be text, images, graphics, barcodes, or any other printed information or security feature. These secondary indicia make counterfeiting more difficult and allow more information to be placed on the validation device. For example, if the validation device was a driver's license, the front of the device could have an image, text, and a signature. The back of the device could hold a one or two dimensional barcode and other security features.

The validation device indicia preferably comprises biometric information. There has been a movement towards developing more secure methods of automated recognition based on unique, externally detectable, personal physical anatomic characteristics such as fingerprints, iris pigment pattern and retina prints, or external behavior characteristics; for example, writing style and voice patterns. Known as biometrics, such techniques are effective in increasing the reliability of recognition systems by identifying a person by characteristics that are unique to that individual. Some representative techniques include fingerprint recognition focusing on external personal skin patterns, hand geometry concentrating on personal hand shape and dimensions, retina scanning defining a person's unique blood vessel arrangement in the retina of the eye, voice verification distinguishing an individual's distinct sound waves, and signature verification. When the indicia contain biometric information, another level of security is added to the validation device making it more difficult to copy or counterfeit.

The embodiment comprising a light guiding layer has polymer layers on either side of the polymer light guiding layer to create an optical waveguide in which the light guiding layer acts as the core and the polymer layers on both sides of the light guiding layer act as cladding. The light guiding layer is made from a light transmitting material. The cladding surrounds the core and has an index of refraction that is less than the index of refraction of the core. Such an arrangement typically results in substantial internal reflection of light traveling through the core. The internal reflection of light occurs when light traveling down the core is reflected back towards the center of the core as the light encounters the inner surface of the cladding. The efficiency of the optical waveguide decreases if the cladding layer is smaller than the core layer by less than 0.03. The cladding can also be a reflective layer. Having a reflective layer (such as metal) surrounding the light guiding layer acts like a mirror and keeps most of the light in the light guiding layer making a very efficient light guide (also called a waveguide).

A variety of materials can be used to form the light guiding layer and the cladding. The light guiding layer is typically formed from a polymeric material, including, for example methacrylates, such as n-butyl methacrylate and 2-ethylhexyl methacrylate. In particular, one suitable core material includes a 1:1 mixture by weight of n-butyl methacrylate and 2-ethylhexyl methacrylate, which, in turn, can contain 0.05% by weight triethylene glycol dimethacrylate crosslinking agent and 0.2% by weight di(4-t-butylcyclohexyl)peroxydicarbonate (Perkadox 16.TM., Akzo Nobel Chemicals, Inc., Chicago, Ill.) thermal initiator. Additional materials and examples are presented in U.S. Pat. No. 5,225,166, incorporated herein by reference.

The layers surrounding the light guiding layer, or cladding, can be formed from a variety of different compounds. Polymers are preferred as they are cheap and easily processable. As an example, fluoropolymers have been found to be useful as a cladding for the light guiding layer.

The validation device with a light guiding layer preferably has a light input area. This area can be used to input light into the light guiding layer of the card. The input area is typically on the side of the validation device. Preferably, the light guiding layer has a color. When light (either white or colored) is applied to the light input area it is guided through the light guiding layer and is colored by the color in the light guide layer. For example, if white light is applied to the light input area and the light guiding layer is blue colored then the light exiting the light guiding layer will be blue. The light exits at either a light output area on one of the faces of the device or the other side of the device.

The light guide can be a film or a straight or curved fibers embedded in the light guiding layer, to form a pattern, image, or text. The light guide layer could can contain round or cylindrical fibers, or the device can also be made with a non-round configuration. A square, triangular, star or flat strip waveguide can be constructed and will have the same change in color with viewing angle. These non-round waveguide may have increased light loss, but these security waveguide devices are typically quite short so that their reduced efficiency cause by their non-round shape, their use of colorants and higher light loss optical materials is not a limiting restriction, as it is in optical fibers used in communications. The fibers could be laminated, or any other method of adhering the fiber, into the device to form the light guide layer so that the light guide layer would comprise the light guiding fibers adhered on both sides polymeric layers.

The light guiding layer preferably comprises dye or pigment because they have excellent color reproduction and color stability. Dyes and pigments are able to create a large color gamut and saturation. Furthermore, they are easily incorporated into extrusions and coatings. Nano-sized pigments can also be used, with the advantage that less of the pigment is needed to achieve the same color saturation because the pigment particles surface area to volume ratios are so large they are more efficient at adding color.

A wide variety of light sources for the light guiding layer can be used. Both monochromatic light sources, such as lasers or sources which are filtered to allow only a specific wavelength of light, and polychromatic light sources, such as incandescent or electrical arc sources can be used.

The light exiting area could be a specular light exiting area or a diffuse light exiting area. To have more specular light exiting, a more specular light source is used, such as a laser, and pyramidal or other geometric shapes are used to direct the light out of the light guiding layer. For more diffuse light exiting the light guiding layer, a more diffuse source is preferred with the light exiting area having a surface roughness. This roughness directs the light out of the light guiding layer diffusely. The roughness may be pits or craters with hemispherical, ovoid, grooves, or irregular shapes and may include portions that are raised above the original surface of light guiding layer.

Preferably, an image is displayed in color when the specular reflective layer is viewed when light is applied to the light input area of the device. Colored light can be applied to the light input area or the light guiding layer has coloration to give the light exiting the light guiding layer coloration. The image is in registration with the light exiting area so that when light is applied to the light input area it exits in registration with the image illuminating it in colored light.

The light guiding layer preferably further comprises fluorescent or phosphorescent materials. As light passes through the light guiding layer the florescent and phosphorescent materials will "glow". The phosphorescent materials will continue to glow for a specified time after the light has removed. The "glowing" light exiting areas can form text, images, and graphics in registration with the indicia. This could be used, for example, on a driver's license as an easy way for a police officer to detect if a driver's license is authentic in the dark by shining their flashlight onto the license to see if it has a fluorescent or phosphorescent pattern on it. A typical fluorescent material is BLANCOPHOR SOL from Bayer/USA.

Phosphorescent materials comprise phosphorescent pigments that are available in various colors including blue, green, yellow, orange, and red. The most common phosphorescent pigment is yellowish-green, which is brightest to the human eye, and has a wave length of about 530 nanometers. This pigment is composed of a copper-doped zinc sulfide. A phosphorescent pigment can remain visible in the dark for up to four hours and longer, depending on the source and intensity of excitation energy, the dark adaptation of the eyes, ambient light, and area of and distance from the phosphorescence, as well as other factors. A high ultraviolet (UV) source of energy is considered most effective as an excitation source, although virtually any light is effective at stimulating phosphorescence at some level.

In providing a fluorescent or phosphorescent pigment in a form in which it can be coated or onto a substrate, the pigments are dispersed in a binding medium that must be substantially transparent and, in fact, should be of a high transparency. The particular binding medium can be selected by the skilled artisan depending on the material to be coated or in which the phosphorescent material is to be blended. Zinc Sulfide and Strontium Aluminate are two common phosphorescent materials.

Preferably, the validation device has metallic layers with openings on both sides of the light guiding layer. This enables the illumination of both sides of the validation device when a light is applied to the light input area. Furthermore, the openings in the metallic reflective layers could registration with each other or with the indicia on each side of the card increasing the complexity of the validation device and making the device more difficult to copy or counterfeit. Having the openings in registration with each other is preferred because it allows for light to pass through the device. This adds an easily authenticated security feature to the device. In another embodiment, the openings are in registration so that pre-determined portions of the indicia on both sides of the device are illuminated with light is applied to the light input area. This creates an easily authenticable device (a police officer can shine a flashlight at the light input area and see if the indicia "light up" correctly) that is very difficult to counterfeit.

Preferably, additional layers are added to the validation device to add extra utility. Such layers might contain tints, antistatic materials, or an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis (O-Cyanostyryl) Benzol and 2-Amino-4-Methyl Phenol. Optical brightener can be used in a skin layer leading to more efficient use of the optical brightener.

The layers in the validation device may be coated or treated with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion. The validation device of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyarylate and triacetyl cellulose.

The validation device of the invention may also be used in conjunction with a light diffuser, for example a bulk diffuser, a lenticular layer, a beaded layer, a surface diffuser, a holographic diffuser, a micro-structured diffuser, another lens array, or various combinations thereof. The validation device may also be used in an application with more than one sheet of the light management film stacked, or with any other optical film including brightness enhancement films, retroreflective films, waveguides, and diffusers.

In order to make the validation device of the current invention more difficult to counterfeit or copy other security features may be added to the validation device. Examples of security features that may be incorporated include complex printed patterns, micro-printed identifiers, watermarks, and ultraviolet fluorescing fibers. Preferably, the specular reflective layer or the polymer protective layer contains a hologram(s). This adds another security feature to the device and if the hologram is formed on the metallic reflective layer, the metallic reflective layer preferably has a thickness of less than about 10 microns, so that it is extremely difficult to remove the foil from a security article to which it has been applied, without at least partially tearing or destroying the foil. A smart chip, or RF and chip can be incorporated into the validation device. Other security features include pearlescent particles in a transparent binder, microstructured surfaces providing special optical effects such as holographic images or diffractive effects, etc. Similarly, electronically interactive circuits can be incorporated in cards of the invention.

Used herein, the phrase "imaging element" comprises an imaging support, along with an image receiving layer as applicable to multiple techniques governing the transfer of an image onto the imaging element. Such techniques include thermal dye transfer, electrophotographic printing, or ink jet printing, as well as a support for photographic silver halide images.

Preferably, a thermal printer forms the indicia (including images, text, and graphics). Thermal printing produces good image quality and is already in place in the security card industry.

The thermal dye image-receiving layer of the receiving elements of the invention may comprise polymers or mixtures of polymers that provide sufficient dye density, printing efficiency and high quality images. For example, polycarbonate, polyurethane, polyester, polyvinyl chloride, poly (styrene-co-acrylonitrile), poly(caprolactone), polylatic acid, saturated polyester resins, polyacrylate resins, poly (vinyl chloride-co-vinylidene chloride), chlorinated polypropylene, poly(vinyl chloride-co-vinyl acetate), poly (vinyl chloride-co-vinyl acetate-co-maleic anhydride), ethyl cellulose, nitrocellulose, poly(acrylic acid) esters, linseed oil-modified alkyd resins, rosin-modified alkyd resins, phenol-modified alkyd resins, phenolic resins, maleic acid resins, vinyl polymers, such as polystyrene and polyvinyltoluene or copolymer of vinyl polymers with methacrylates or acrylates, poly(tetrafluoroethylene-hexafluoropropylene), low-molecular weight polyethylene, phenol-modified pentaerythritol esters, poly(styrene-co-indene-co-acrylonitrile), poly(styrene-co-indene), poly(styrene-co-acrylonitrile), poly(styrene-co-butadiene), poly(stearyl methacrylate) blended with poly(methyl methacrylate). Among them, a mixture of a polyester resin and a vinyl chloridevinyl acetate copolymer is preferred, with the mixing ratio of the polyester resin and the vinyl chloride-vinyl acetate copolymer being preferably 50 to 200 parts by weight per 100 parts by weight of the polyester resin. By use of a mixture of a polyester resin and a vinyl chloride-vinyl acetate copolymer, light resistance of the image formed by transfer on the image-receiving layer can be improved.

The dye image-receiving layer may be present in any amount that is effective for the intended purpose. In general, good results have been obtained at a concentration of from about 1 to about 10 g/m$^2$. An overcoat layer may be further coated over the dye-receiving layer, such as described in U.S. Patent No. 4,775,657 of Harrison et al.

Dye-donor elements that are used with the dye-receiving element of the invention conventionally comprise a support having thereon a dye containing layer. Any dye can be used in the dye-donor employed in the invention, provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803; and 5,023,228. As noted above, dye-donor elements are used to form a dye transfer image. Such a process comprises image-wise-heating a dye-donor element and transferring a dye image to a dye-receiving element as described above to form the dye transfer image. In a preferred embodiment of the thermal dye transfer method of printing, a dye donor element is employed which compromises a poly(ethylene terephthalate) support coated with sequential repeating areas of cyan, magenta, and yellow dye, and the dye transfer steps are sequentially performed for each color to obtain a three-color dye transfer image. When the process is only performed for a single color, then a monochrome dye transfer image is obtained.

Thermal printing heads, which can be used to transfer dye from dye-donor elements to receiving elements of the invention, are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The following examples illustrate the practice of this invention. They are not intended to be exhaustive of all possible variations of the invention. Parts and percentages are by weight unless otherwise indicated.

EXAMPLE

In this example a validation device with images, a pattern of specular metallic reflectivity with discontinuous portions, and a light guiding layer was created.

The light guiding layer consisted of an ESTAR brand polyester from Eastman Kodak Company approximately 100 micrometers thick with both surfaces coated with a latex and gelatin subbing layer for adhesion. The light guiding layer was printed on both sides utilizing a thermal printer with a metallic silver donor. The metallic reflective layers were used as no polymeric cladding was needed. The donor consisted of a polyester (PET) base approximately 6 micrometers thick with a release layer and 100 nanometers of metallic silver vacuum coated. The release layer releases when heated (by the thermal print head) and transfers the metallic silver layer to the substrate to be printed (in this case the 100 micrometer PET base with latex and gel subbing layers). The upper side of the PET light guiding layer was printed uniformly with selected circular areas not being printed varying in size from 0.1 millimeters in diameter to 10 millimeters in diameter. The resulting upper reflective layer was a uniform substantially reflective layer with circular discontinuities. The lower side of the light guiding layer was printed in the same manner as the upper reflective layer except that instead text and a barcode were not printed creating a uniform substantially reflective layer with discontinuities in the form of text and a barcode.

The upper and lower protective layers were Kodak Professional Ektatherm XLS transparency material (a biaxially oriented polyester with a typical polycarbonate dye image-receiving layer). The substantially transparent biaxially oriented polyester sheet of the transparency material was the protective layer. The biaxially oriented polyester had the durability to protect the indicia layer from wear. The upper indicia layer was created by printing on the upper protective layer utilizing a Kodak 8670 PS Thermal Dye Transfer Printer with an image and text. The lower indicia layer was formed on the lower protective layer in the same method that the upper indicia were printed, but the indicia printed were text and graphics. The text on the lower indicia layer were printed to match the text discontinuities in the lower reflective layer. The indicia were all printed backwards so that when the validation device was assembled the indicia layer was viewed correctly through the protective layer.

The validation device was assembled by adhering the upper indicia layer to the upper reflective layer and the lower indicia layer to the lower reflective layer with a pressure sensitive adhesive (PSA). The pressure sensitive adhesive was a permanent water based acrylic adhesive 12 micrometers thick. Though a PSA was utilized in this example, any other form of adhesive such as UV cured or heat activated could have been used. The lower indicia layer text lined up with the text discontinuities of the lower reflective layer match when the two were attached.

The structure of the example was as follows:

| |
|---|
| Upper Protective Layer |
| Upper Indicia Layer |
| Pressure Sensitive Adhesive |
| Upper Reflective Layer |
| Light Guiding Layer |
| Lower Reflective Layer |
| Pressure Sensitive Adhesive |
| Lower Indicia |
| Lower Protective Layer |

The validation device of the example prevents counterfeiting because it has multiple indicia (text, an image, graphics, and a barcode). Furthermore, when the device is tampered with, the upper and lower reflective layers, which are very thin and delicate, rip and are destroyed. The indicia are buried under the protective layers and often destroy themselves when the device is pulled apart. This makes the device more tamper-proof because it is difficult to open the device to place a different image (like a person's picture) in the device or to change text (such as a birth date).

The validation device of the example was nearly impossible to copy, even when using an advanced color photocopying techniques or scan because if the specular reflectivity of the device. The scan and photocopy did not capture the reflective nature of the device and lost some of the detail in the indicia and the discontinuities in the reflective layers.

The validation device of the example also contains a light guiding layer that adds another layer of security to the validation device. Light was applied at the side of the device by a flashlight. While light exited the device on the other three sides, it also exited through the discontinuities in the upper and lower reflective layers. Viewing through the upper protective layer, the parts of the indicia were lit up through the circular discontinuities in the upper reflective layer. Viewing through the lower protective layer, the text of the lower indicia layer lit up as the discontinuities in the shape of text matched the text and position of the text of the lower indicia layer and therefore lit up. This creates a very complicated security device that is difficult to forge or tamper with.

The example's protective layers serve as wear resistant surfaces on both sides of the image device to so it will not be easily damaged during handling or use. The layers also provide protection from fingerprinting, spills of liquids, and other environmental deleterious exposures.

The invention has been described in detail with particular reference to certain preferred embodiments thereof, but it will be understood that variations and modifications can be effected within the spirit and scope of the invention.

PARTS LIST

2; Validation device with a specular reflective layer and indicia

10; Lower Protective Layer

11; Upper Protective layer

12; Indicia Layer

14; Specular reflective layer

16; Validation device with a specular reflective layer, indicia, and a light guiding layer Metallic specular reflective layer with discontinuous portions

18; Lower Protective Layer

20; Lower Cladding Layer

22; Light Guiding Layer
24; Upper Cladding Layer
26; Specular Reflective Layer
28; Indicia Layer
30; Upper Protective Layer
32; Validation device with two specular reflective layers surrounding a light guiding layer and indicia
34; Lower Protective Layer
36; Lower Indicia Layer
38; Lower Reflective Layer
40; Light Guiding Layer
42; Upper Reflective Layer
44; Upper Indicia
46; Upper Protective Layer
48, 52, 54, 56, 59; openings
58 and 60; surfaces

What is claimed is:

1. A validation device comprising at least one specular reflective layer, indicia on said reflective layer, a polymer protective layer overlaying said indicia, and a polymer protective layer on the side of the reflective layer opposite to said indicia wherein said indicia are formed by thermal dye transfer, and wherein said at least one specular reflective layer comprises multiple polymer layers of differing refractive index.

2. The validation device of claim 1 wherein said specular reflective layer comprises a metallic layer.

3. The validation device of claim 2 wherein said metallic layer is in a discontinuous pattern.

4. The validation device of claim 3 wherein said discontinuous pattern provides a distance between discontinuous portions of less than 2 micrometers.

5. The validation device of claim 3 wherein said discontinuous pattern provides a distance between discontinuous portions of between 5 and 100 micrometers.

6. The validation device of claim 1 wherein said at least one specular reflective layer comprises a layer having portions of different color.

7. The validation device of claim 1 wherein said at least one specular reflective layer comprises specular reflective material in a pattern.

8. The validation device of claim 1 wherein said multiple polymers layers of differing refractive index comprise a thermal dye receiving layer.

9. The validation device of claim 1 wherein said at least one specular reflective layer has a light transmission of less than 1%.

10. The validation device of claim 1 wherein said at least one specular reflective layer has a light transmission of between 10 and 90%.

11. The validation device of claim 1 wherein said at least one specular reflective layer has a thickness of between 500 and 2000 angstroms.

12. The validation device of claim 1 wherein said at least one specular reflective layer has a thickness of between 10 and 100 angstroms.

13. The validation device of claim 1 wherein said protective layer above said indicia has a hardness of greater than 3H.

14. The validation device of claim 2 wherein said device is provided with at least two separated openings for direct contact of said specular reflective layer wherein said separated openings are separated by at least 1 millimeter.

15. The validation device of claim 2 wherein said at least one specular reflective layer comprises at least one metallic specular reflective layer and a conductive layer separated from said metallic specular reflective layer by a dielectric material.

16. The validation device of claim 15 wherein said conductive layer is substantially transparent.

17. The validation device of claim 1 further comprising secondary indicia on the side of said at least one specular reflective layer opposite to the indicia.

18. The validation device of claim 1 wherein said indicia comprises biometric information.

19. A validation device comprising at least one specular reflective layer, indicia on said reflective layer, a polymer protective layer overlaying said indicia, a polymer protective layer on the side of the reflective layer opposite to said indicia and a polymer light guiding layer, wherein the validation device has layers on each side of said polymer light guiding layer with refractive indexes greater than said polymer light guiding layer by an amount greater than 0.05 and wherein said at least one specular reflective layer is provided with openings wherein said polymer light guiding layer is located between the polymer protective layers.

20. The validation device of claim 19 wherein said device is provided with at least two separated openings for direct contact of said specular reflective layer wherein said separated openings are separated by at least 1 millimeter.

21. The validation device of claim 19 wherein said at least one specular reflective layer comprises at least one metallic specular reflective layer and a conductive layer separated from said metallic specular reflective layer by a dielectric material.

22. The validation device of claim 21 wherein said conductive layer is substantially transparent.

23. The validation device of claim 19 further comprising secondary indicia on the side of said at least one specular reflective layer opposite to the indicia.

24. The validation device of claim 19 wherein said polymer light guiding layer has a color.

25. The validation device of claim 19 wherein said device further comprises a light input area.

26. The validation device of claim 19 wherein an image will be displayed in color when said specular reflective layer is viewed when light is applied to the light input area of said device.

27. The validation device of claim 19 wherein said polymer light guiding layer comprises phosphorescent material.

28. The validation device of claim 19 wherein said device comprises metallic layers with openings on both sides of said polymer light guiding layer.

29. The validation device of claim 19 wherein said openings are in registration such that light may pass through said device.

30. The validation device of claim 19 wherein said indicia and said openings are in registration such that predetermined portions of said indicia are illuminated by said light guide.

31. The validation device of claim 19 wherein said polymer light guiding layer is on the side of the reflective layer opposite to said indicia.

32. A validation device comprising at least one specular reflective layer, indicia on said reflective layer, a polymer protective layer overlaying said indicia, and a polymer protective layer on the side of the reflective layer opposite to said indicia wherein said indicia are formed by thermal dye transfer and wherein said device is provided with at least two separated openings for direct contact of said specular reflective layer wherein said separated openings are separated by at least 1 millimeter.

33. The validation device of claim 32 wherein said specular reflective layer comprises a metallic layer.

34. The validation device of claim 32 wherein said at least one specular reflective layer comprises a layer having portions of different color.

35. The validation device of claim 32 wherein said at least one specular reflective layer comprises specular reflective material in a pattern.

36. The validation device of claim 32 wherein said at least one specular reflective layer has a thickness of between 500 and 2000 angstroms.

37. The validation device of claim 32 wherein said at least one specular reflective layer has a thickness of between 10 and 100 angstroms.

38. The validation device of claim 32 wherein said indicia comprises biometric information.

39. A validation device comprising at least one specular reflective layer, indicia on said reflective layer, a polymer protective layer overlaying said indicia, and a polymer protective layer on the side of the reflective layer opposite to said indicia wherein said indicia are formed by thermal dye transfer wherein said at least one specular reflective layer comprises at least one metallic specular reflective layer and a conductive layer separated from said metallic specular reflective layer by a dielectric material.

40. The validation device of claim 39 wherein said specular reflective layer comprises a metallic layer.

41. The validation device of claim 40 wherein said metallic layer is in a discontinuous pattern.

42. The validation device of claim 41 wherein said discontinuous pattern provides a distance between discontinuous portions of less than 2 micrometers.

43. The validation device of claim 41 wherein said discontinuous pattern provides a distance between discontinuous portions of between 5 and 100 micrometers.

44. The validation device of claim 39 wherein said at least one specular reflective layer has a thickness of between 500 and 2000 angstroms.

45. The validation device of claim 39 wherein said protective layer above said indicia has a hardness of greater than 3H.

46. The validation device of claim 39 wherein said conductive layer is substantially transparent.

47. The validation device of claim 39 wherein said indicia comprises biometric information.

* * * * *